UNITED STATES PATENT OFFICE.

HENRY A. HUGHES, OF VINELAND, AND HENRY A. HUGHES, JR., OF HADDON HEIGHTS, NEW JERSEY.

PROCESS FOR PREPARING AN IMPROVED SUGAR PRODUCT.

1,402,615. Specification of Letters Patent. Patented Jan. 3, 1922.

No Drawing. Application filed October 12, 1917. Serial No. 196,171.

*To all whom it may concern:*

Be it known that we, HENRY A. HUGHES and HENRY A. HUGHES, Jr., citizens of the United States, residing in Vineland, Cumberland County, and Haddon Heights, Camden County, New Jersey, respectively, have invented a Process for Preparing an Improved Sugar Product, of which the following is a specification.

Our invention relates to compositions of matter of a chemical or edible nature and the preparation thereof, and it comprises an improved saccharine body having the property of keeping various substances with which it may be employed soft and pliant; being particularly available for use as a substitute for glycerin in the arts. Our invention further includes the process of making this improved product.

Our improved product may be used generally as a substitute for glycerin, with the exception that it probably posseses no medicinal values, and additionally, it may be employed as a softener and sweetener for food products.

Our invention comprises an improved treatment of ordinary refined cane sugar to effect inversion; then arresting such inversion at the critical point in a special manner, and then, if necessary, neutralizing any acid that may be present in the finished product. This treatment may involve the addition of water and a suitable acid, preferably phosphoric acid, to the sugar and the heating of the solution to invert said sugar, or we may employ electrolysis to effect inversion. After inversion has proceeded to the desired and predetermined point, we add a quantity of a sugar solution of a lower temperature to lower the temperature of the inverting solution in order to produce a syrup that is at once proof against spoiling (fermenting), and is non-crystallizable; such product remaining clear and keeping indefinitely under usual conditions. Inversion having continued until the polariscope reading of the solution equals 0°; the amount of cool sugar solution added should contain sufficient sugar (sucrose) to raise the polariscope reading of the combined mass to some suitable point between plus fifteen degrees (+15°) and plus twenty-seven degrees (+27°); the preferred and ideal reading being approximately plus twenty-two and one-half degrees (+22½°).

Our improved product is a thick, odorless body, very pale yellow in color, having the pure sweet taste of cane sugar, and being miscible with water in all proportions. Chemical analysis of the product at a density of about 42° Bé., and a temperature of 60° F., should show substantially the following:

| | |
|---|---|
| Invert sugar | 46.8 % |
| Sucrose | 29.35% |
| Ash | 0.05% |
| Water by difference | 23.8 % |

Our improved product is esentially a mixture of invert sugar and sucrose, maintained in a liquid state by water; free from heavy metals, arsenic, glycerin, chlorides and sulfates.

Our improved product may be distinguished from other products by the following characteristics. It has a much higher density than that of ordinary cane sugar solutions at the crystallizing point but will remain indefinitely a clear, practically colorless, neutral, pure syrup of cane sugar. It will not precipitate crystals of cane sugar; invert sugar, or cane sugar dextrose. The above characteristics and others possessed by our improved product are obtained by controlling the process of inversion of cane sugar so that it shall be stopped and maintained indefinitely at a predetermined point which may be indicated by the usual instruments and methods common in the manufacture of sugar, in order that the relative purities of the invert sugar content of the cane sugar: i. e., dextrose and levulose, produced by the act of inverting the original cane sugar, are in no case high enough to allow crystallization or precipitation of any or all of them; thus maintaining a clear, pure, sweet syrup under the usual climatic changes of heat and cold.

In preparing our improved product, we may proceed as follows:

To approximately eight (8) barrels of commercial granulated cane sugar (about twenty-eight hundred (2800) lbs.,) we add about fifty (50) gallons of water (416.5 lbs.) and about fourteen (14) oz. of 85%, C. P. phosphoric acid; such mixture being then heated at a temperature of about 190° F. for a period of approximately one-half (½) hour. The result of this treatment, if the time and temperature factors are in substantial accordance, will be to invert the sugar content of the solution to a polariscope reading of approximately zero (0°), at which point the desired inversion for our purpose is substantially complete. Unless the heating be arrested at this point, however, further inversion will occur, and in order to stop further inversion and at the same time complete the preparation of our improved product, we add to the hot mass of inverting sugar syrup about twenty-two hundred and forty (2240) lbs. of a 70% sugar solution in a relatively cold state (about 60° F.) the result of which addition is to lower the temperature of the inverting mass at once; thereby stopping inversion, and raising the polariscope reading of the combined product or mixture to some point between plus fifteen degrees (+15°) and plus twenty-seven degrees (+27°), the ideal condition giving a polariscope reading of about plus twenty-two degrees (+22°) or plus twenty-two and one-half degrees (+22½°), when the product is ready for use. Should tests of the finished product show an acid reaction, a suitable alkali is added to insure neutrality.

Our improved product, prepared in accordance with the process described, is a pure, neutral, non-crystallizable syrup, nearly water white. It does not precipitate crystals or clouds of cane sugar, invert sugar, or cane sugar dextrose; contains no free acid, nor any higher percentage of salts than ordinarily found in commercially pure cane sugar.

Our improved product is hygroscopic, and in thin layers does not become hard and brittle after exposure to the air. In all instances where a softening effect is desired, it will replace glycerin. As a food product, it may be employed as a syrup, or as a sugar substitute.

In our improved process, inversion of the sugar solution whereby invert sugar is produced may be effected by electrolysis, in lieu of the heat and acid treatment. In either instance, the result of inversion is the separation of the pure sugar syrup into the three sugars—levulose, dextrose, and sucrose; the quantities of levulose and dextrose being substantially equal, and the total quantity of the three sugars equaling about 75 per cent of the total content of the original sugar solution at a density of about 42° Baumé; the remaining portion of the solution being water and traces of ash.

We claim:

1. The process which consists in adding water and an acid to granulated cane sugar; heating the mixture to about 190° F. for approximately one-half hour to invert the sugar content of the solution to a polariscope reading of approximately zero degrees; and stopping the inversion at such reading by adding a seventy per cent cane sugar solution at a temperature of 60° F., thereby producing a mixture having a polariscope reading between +18° and +22°.

2. The process which consists in producing the inversion of granulated cane sugar syrup and arresting such inversion at approximately zero degrees polariscope reading by the addition of a relatively cold seventy per cent cane sugar solution to produce a mixture having a polariscope reading between +18° and +22°.

HENRY A. HUGHES.
HENRY A. HUGHES, Jr.